March 4, 1952  E. W. HOLMES  2,588,002
HYDRAULICALLY OPERATED MOBILE WEED AND BRUSH CUTTER
Filed March 26, 1948  8 Sheets-Sheet 1
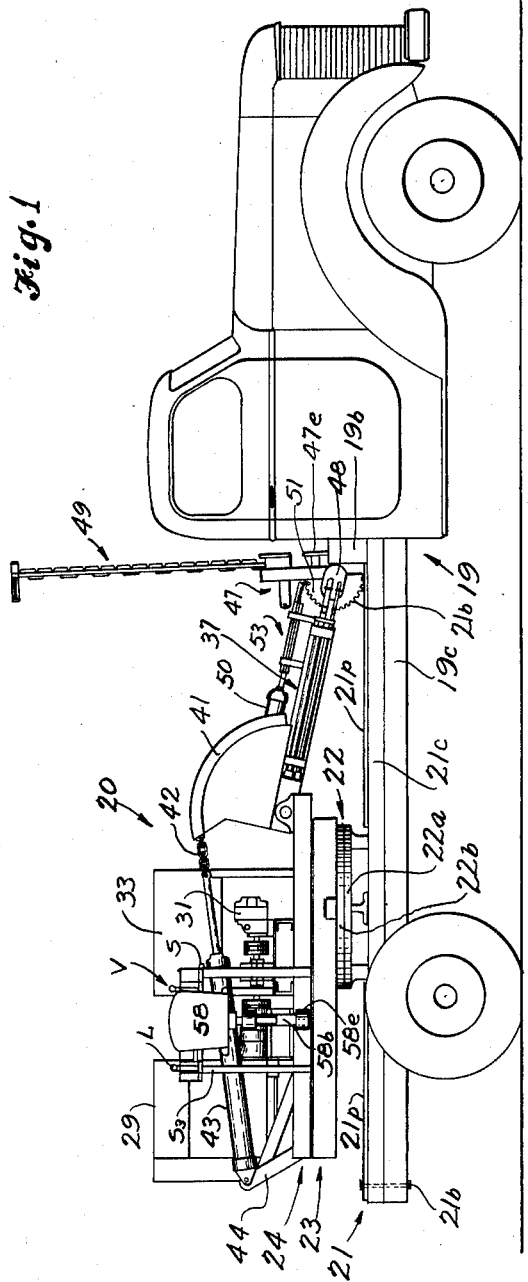
INVENTOR.
Earl W. Holmes
BY
Fred C. Matheny
ATTORNEY March 4, 1952     E. W. HOLMES     2,588,002
HYDRAULICALLY OPERATED MOBILE WEED AND BRUSH CUTTER
Filed March 26, 1948     8 Sheets-Sheet 2
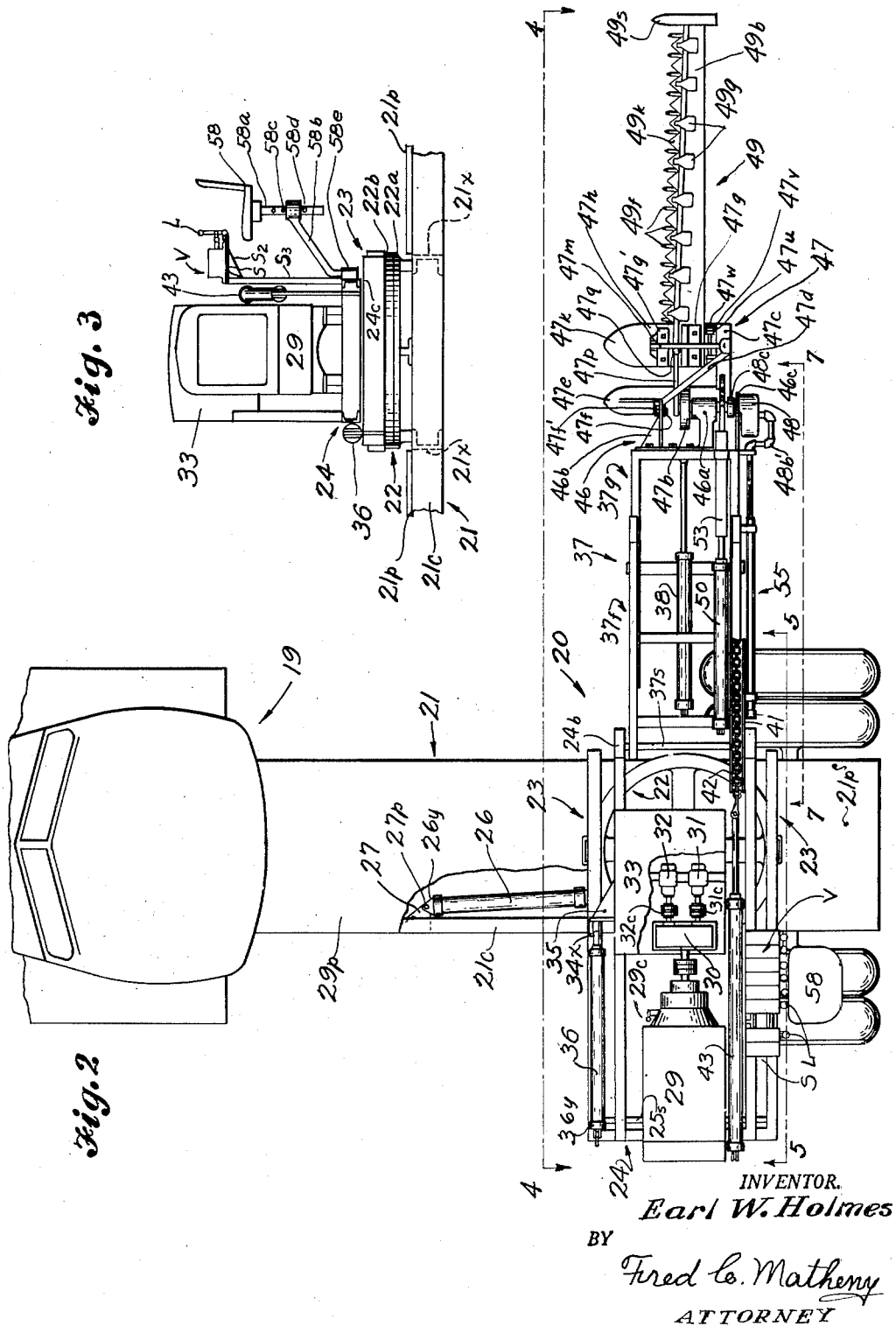
INVENTOR.
*Earl W. Holmes*
BY
*Fred C. Matheny*
ATTORNEY

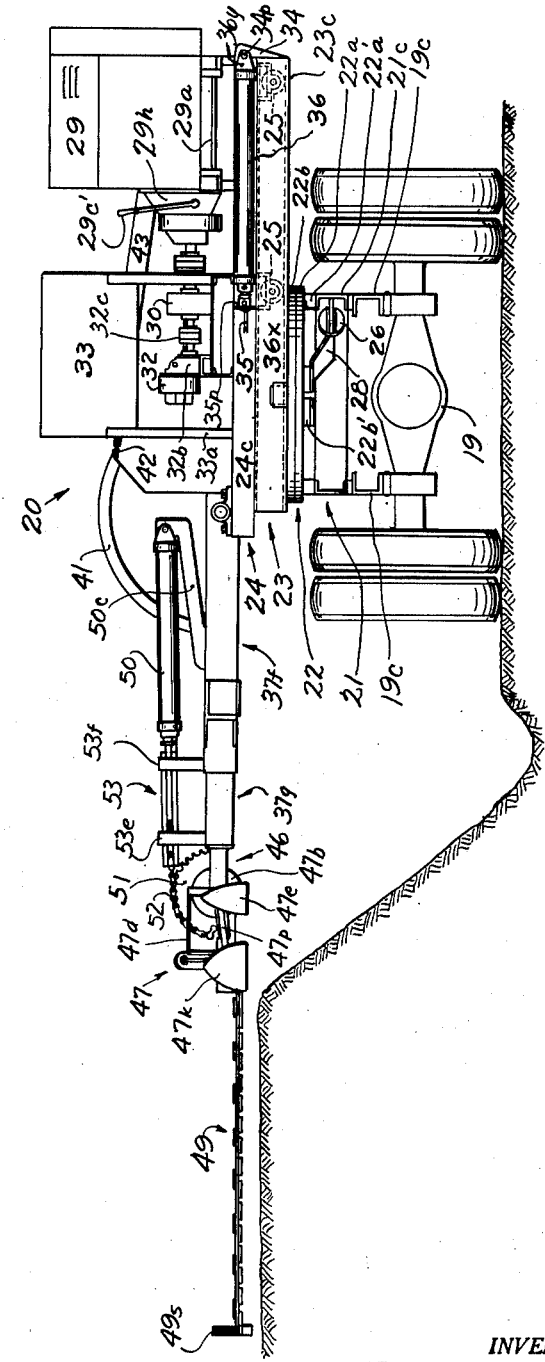

March 4, 1952  E. W. HOLMES  2,588,002
HYDRAULICALLY OPERATED MOBILE WEED AND BRUSH CUTTER
Filed March 26, 1948  8 Sheets-Sheet 4
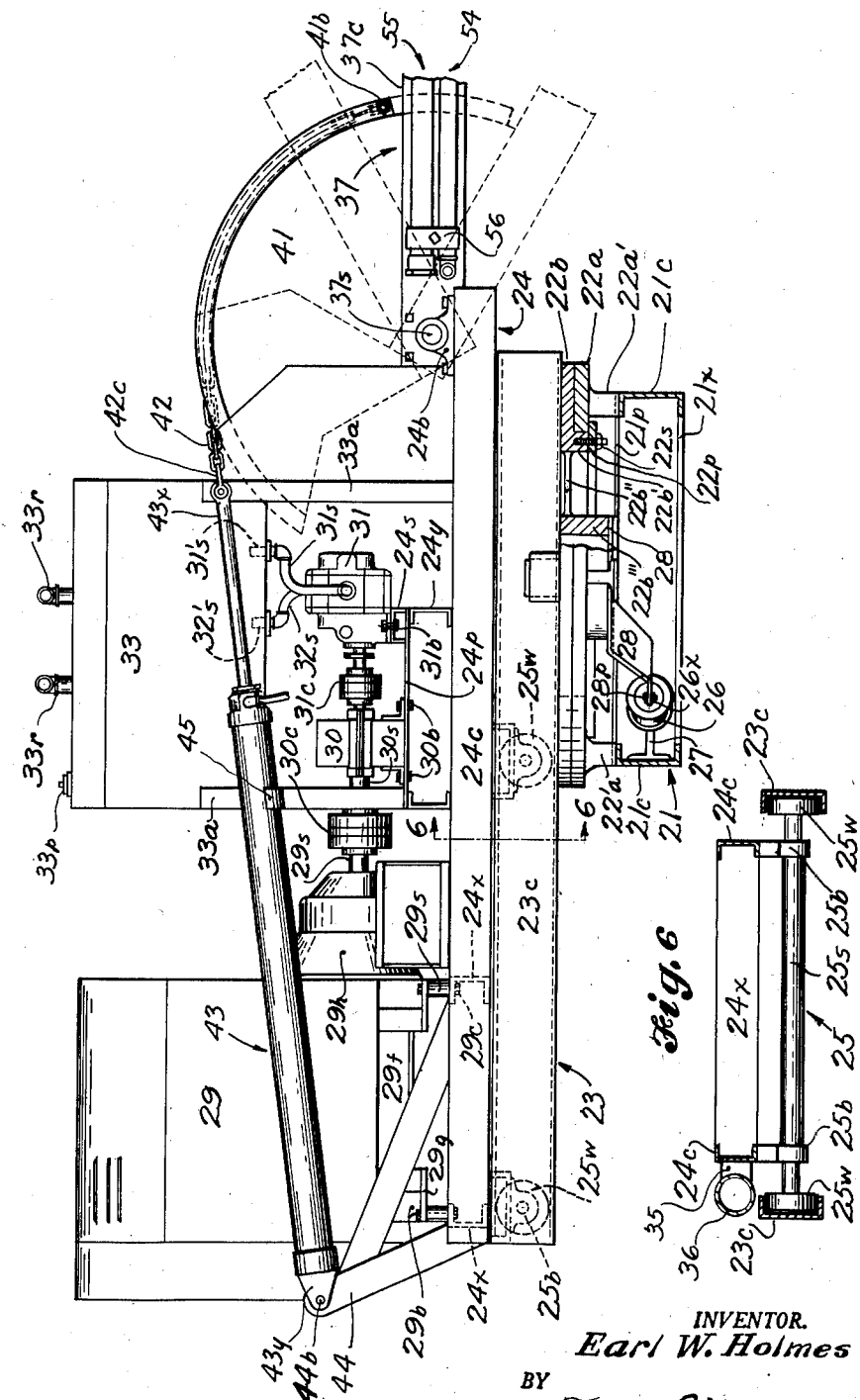
INVENTOR.
Earl W. Holmes
BY
Fred C. Matheny
ATTORNEY

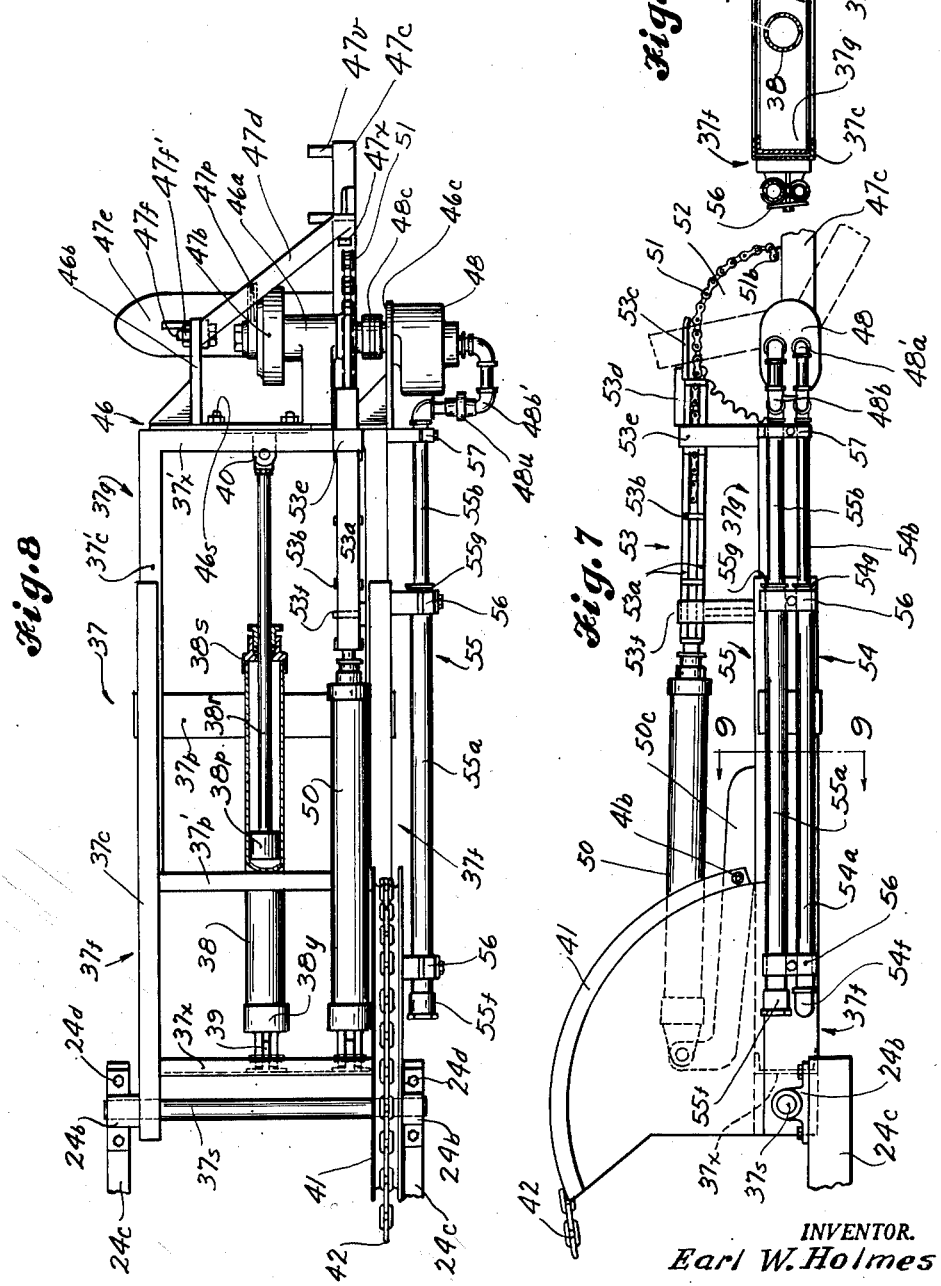

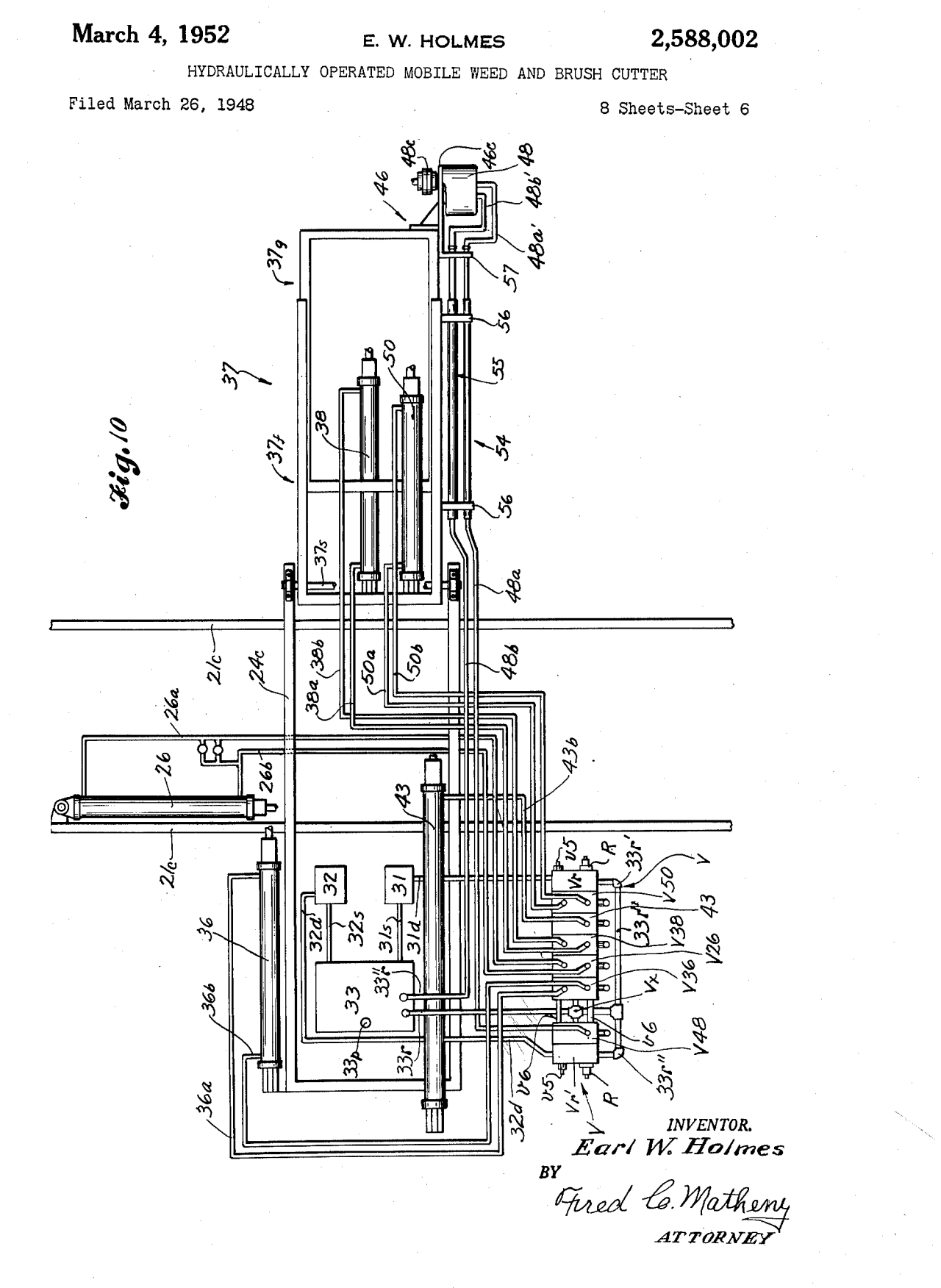

March 4, 1952

E. W. HOLMES 2,588,002

HYDRAULICALLY OPERATED MOBILE WEED AND BRUSH CUTTER

Filed March 26, 1948

INVENTOR.
*Earl W. Holmes*
BY
*Fred C. Matheny*
ATTORNEY

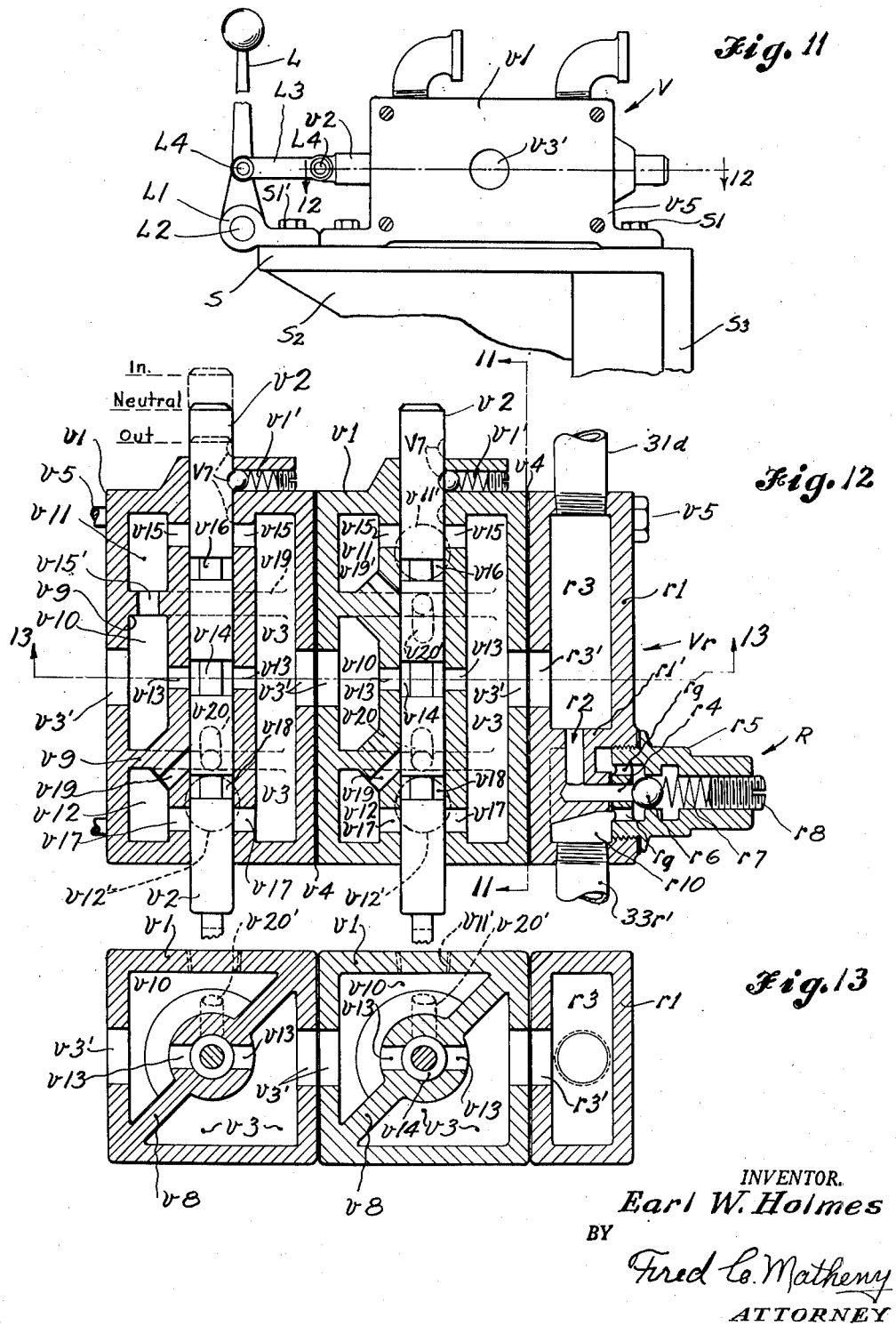

March 4, 1952        E. W. HOLMES        2,588,002
HYDRAULICALLY OPERATED MOBILE WEED AND BRUSH CUTTER
Filed March 26, 1948        8 Sheets-Sheet 8
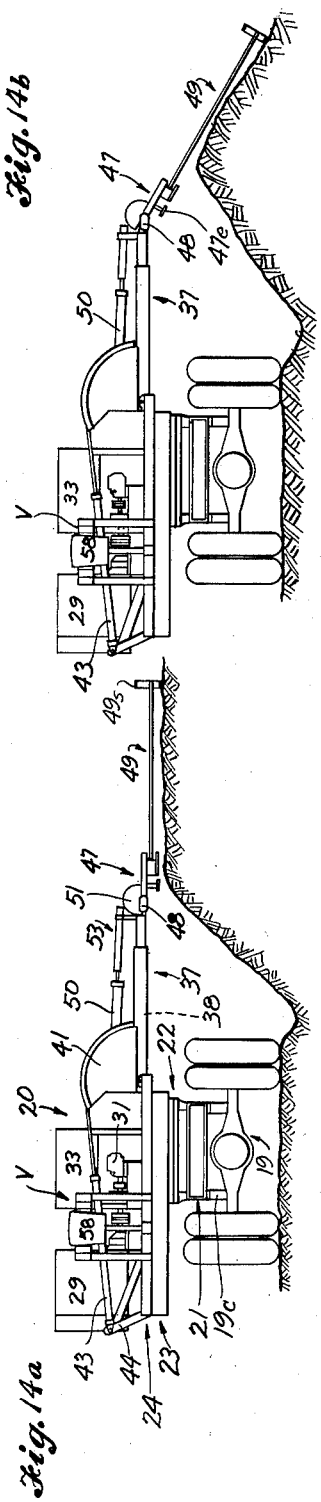
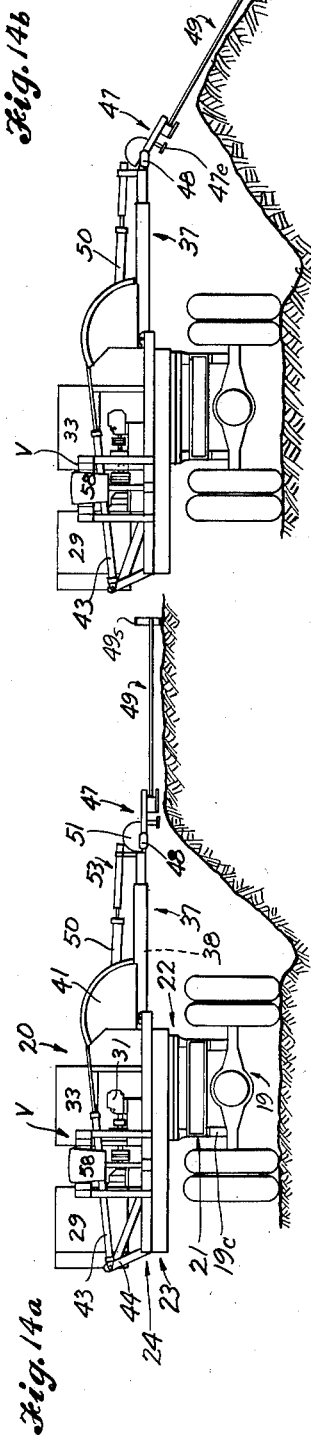
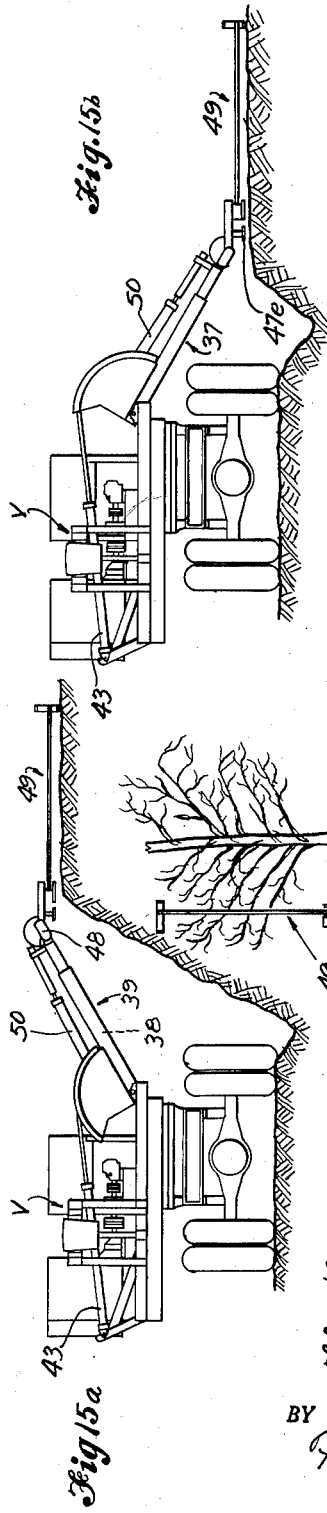
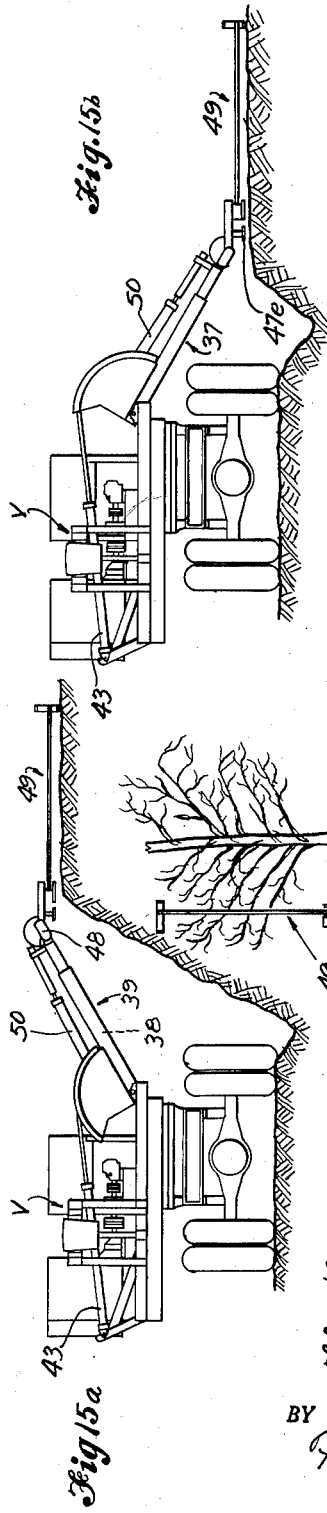
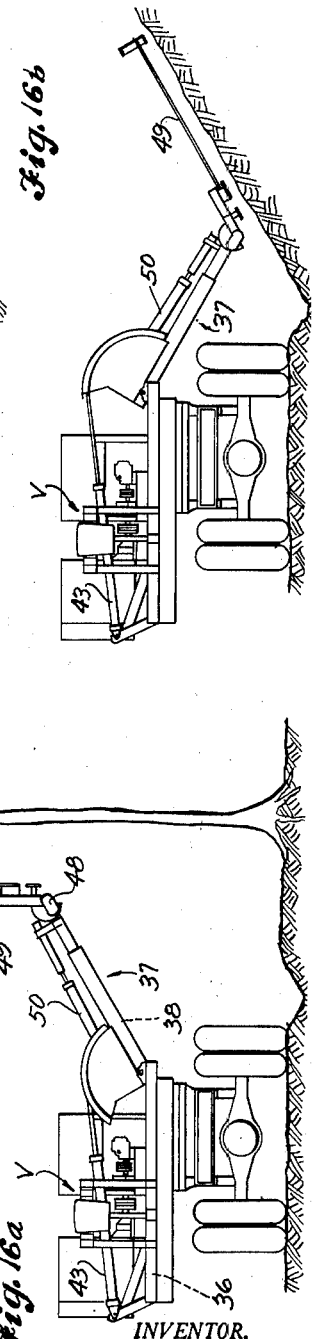
INVENTOR.
Earl W. Holmes
BY
Fred C. Matheny
ATTORNEY Patented Mar. 4, 1952

2,588,002

UNITED STATES PATENT OFFICE 2,588,002

HYDRAULICALLY OPERATED MOBILE WEED AND BRUSH CUTTER

Earl W. Holmes, Burlington, Wash.

Application March 26, 1948, Serial No. 17,344

11 Claims. (Cl. 56—25)

This invention relates to mechanical mowing equipment in general, and particularly to improvements in hydraulically operated mobile weed and brush cutters adapted to be mounted upon an automotive truck so the equipment may be quickly transported from place to place for cutting weeds and brush along the sides of roadways, thereby greatly reducing the cost of this phase of highway maintenance work.

Heretofore small tractors equipped with mowing sickles driven by their power take-offs and provided with limited hand lever adjustments have been used to do the basic road-side mowing of grass and weeds, but these have had to be supplemented by a large amount of hand work for cutting such growth along the sloping banks of cuts and fills made in grading the road, and in ditches, and for cutting brush and the overhanging boughs of trees.

Since the places where such sickle-equipped tractors can be used to advantage may be several miles apart, it is customary to use a truck with low-slung bed for transporting the tractor and crew, otherwise considerable useful time is lost in driving the relatively slow speed tractor to its successive working locations.

An object of my invention is to provide an improved mobile weed and brush cutter in which the cutter sickle is driven by a directly coupled hydraulic motor, thereby eliminating all driving belts, drive shafts and gears, such as have heretofore been employed;

Another object is to provide a device of the class described in which the cutter sickle can be quickly and easily adjusted by hydraulic motivating and control means to any of a large number of extended, angular and overhead operating positions while the mobile carrier is in motion;

A further object is to provide a device of the class described which has a power plant independent of that of the mobile unit so its speed and power output may be separately controlled.

A still further object is to provide a device of the class described that may be swung upon the bed of the mobile carrier to various angular operating positions from and to a now operating position in which the device is placed to facilitate rapid transportation from place to place by said mobile carrier.

An additional object is to provide a device of the class described having a hydraulic operating and control system that is simple in construction and easy to operate.

Other objects and advantages will be apparent to those skilled in the art from the following detail description of a preferred form of the invention that comprises the novel construction and combination of component parts which coact to achieve the improved results described, the same being illustrated in the accompanying drawings and embraced in the appended claims.

In the drawings:

Figure 1 is a side elevation of an automotive truck type of mobile carrier, with the cutter mechanism assembly swung into the inoperative position used for fast travel from place to place;

Fig. 2 is a plan view of the same with the cutter mechanism assembly swung into its normal operating position, and with the adjustable support frame and cutter sickle in their extended horizontal positions, the front portion of the truck being omitted;

Fig. 3 is an elevation viewed from the engine end of the cutter mechanism plant;

Fig. 4 is a side elevation of the cutter mechanism with section through the trucks taken on broken line 4—4 of Fig. 2, and with operators seat and control valves removed;

Fig. 5 is an enlarged elevation of the power plant, turn table, turn table frame and other elements of the cutter mechanism independent of the mobile carrier taken on broken line 5—5 of Fig. 2, with a fragmentary section through the articulated turntable elements, and with the operators seat and control valves removed;

Fig. 6 is a section taken on broken line 6—6 of Fig. 5, showing mechanism used to adjustably support the cutter mechanism plant upon the turntable channels;

Fig. 7 is a side elevation of the adjustable support frame and mechanism as viewed at broken line 7—7 of Fig. 2, but to the same scale as Figs. 5 and 6;

Fig. 8 is a plan view of the same, with a medial section through one of the hydraulic operating cylinders;

Fig. 9 is a section taken on broken line 9—9 of Fig. 7 showing the telescoping sections of the adjustable support frame;

Fig. 10 is a diagram of the hydraulic operating and control system;

Fig. 11 is a side elevation of the control valve assembly mounted upon its support frame with the relief valve unit removed, and to a smaller scale as viewed on broken line 11—11 of Fig. 12;

Fig. 12 is a medial section through two control valve units taken on broken line 12—12 of Fig. 11 with the relief valve unit in position;

Fig. 13 is a section taken on broken line 13—13 of Fig. 12;

Fig. 14a is a small scale end view showing the sickle of this invention positioned for roadside cutting in a horizontal plane approximately level with the deck of the truck which carries the machine.

Fig. 14b is a similar view showing the sickle downwardly inclined for cutting vegetation on a slope.

Fig. 15a is another similar view showing the sickle positioned for cutting in a horizontal plane above the plane of the deck of the truck which carries the machine.

Fig. 15b is another similar view showing the sickle positioned for cutting in a horizontal plane a substantial distance below the plane of the truck deck.

Fig. 16a is another similar view showing the sickle positioned approximately vertical for tree trimming.

Fig. 16b is another similar view showing the sickle upwardly inclined from inner to outer end thereof for cutting on a slope.

*Removable cutter mechanism unit*

Like numerals and letters of reference indicate like parts throughout the several figures of the drawings, in which an automotive truck 19 is illustrated as the mobile carrier for the cutter mechanism unit designated in its entirety by the numeral 20.

Although this type of carrier is suitable for highway maintenance and the like, it will be apparent that the cutter mechanism unit is a separate mechanical entity and may be mounted upon any other type of carrier. In Fig. 1 it will be noted that channels 21c of the cutter mechanism unit foundation frame 21 may be removably secured to bed frame channels 19c of the truck bed frame by means of bolts and nuts 21b. This provides for the removal of said cutter mechanism unit in its entirety from the mobile carrier so either may be overhauled or repaired independently of the other, or used interchangeably with other said carriers or other said cutter units, respectively.

*Turntable for cutter mechanism plant*

An important feature of the invention resides in a turntable support 22 for the cutter mechanism plant portions of the said entire unit. The lower annular member 22a of said turntable may have legs 22a' supported by and fixedly secured to side channels 21c and cross members 21x of foundation frame 21, as shown best in Figs. 4, 5 and 2. Said foundation frame may have deck plates 21p either side of the turntable as shown in Fig. 1. The upper annular member 22b, of the turntable may be provided with an interior depending annular flange 22a' that articulates with the bore of the base member and receives a set of stud bolts 22s adapted to removably secure retaining ring 22r in position as indicated by the fragmentary section shown in Fig. 5.

This turntable preferably is relatively large in diameter in order to provide optimum mounting stability for the cutter mechanism plant which is adjustably supported thereby through the intermediacy of turntable frame 23, side channels 23c of which preferably are fixedly secured to upper ring member 22b. The cutter mechanism plant having base frame 24 may be adjustably supported by said frame 23 through the intermediacy of any suitable rolling means, such as trucks 25. Each said truck comprises bearings 25b in which a shaft 25s is journalled, and wheels 25w fixedly secured to the ends of said shaft and supported by the inturned flanges of channels 23c.

When no other means are illustrated or described in this specification it will be understood that where structural and other member are specified as fixedly secured one to the other, fusion welding is the preferred means of fastening.

Rotation of the cutter mechanism plant upon the turntable through an angle of 90 degrees, from the longitudinal position shown in Fig. 1 to the transverse position on the truck shown in Fig. 2, may be accomplished by a double-acting hydraulic cylinder assembly 26. Each such cylinder assembly, indicated by a single reference number, preferably is similar to that of cylinder 38, shown partly in medial section in Fig. 8, which may consist of a cylinder tube closed at one end by yoke head 38y and by a stuffing gland head 38s at the other end, together with a reciprocating piston 38p and piston rod 38r.

Coacting with cylinder 26 to accomplish the aforesaid rotation is bracket 27 fixedly secured to channel 21c to which yoke 26y is pivotally connected by pin 27p, and bent lever 28 fixedly secured to the lower end of hub 22b''' dependent from arms 22b'' of turntable ring 22b, and to which the yoke end 26x of the piston rod is connected by pin 28p, as shown in Figs. 2 and 5.

With hydraulic pressure applied to the front end of the cylinder it will be apparent that as the piston is forced inwardly the upper turntable ring and the cutter mechanism plant supported thereby will be swung, say from the position shown in Fig. 1 to that shown in Fig. 2. Conversely, when pressure is applied to the rear end of the cylinder the resulting outward thrust of the piston will return said cutter mechanism plant to its initial position.

*Power plant and pumps*

Power for the development of said hydraulic pressure for this and the other hydraulic operating and control requirements may be supplied by means of internal combustion engine unit 29 provided with a base casting 29f having legs with outturned feet 29g, which are supported through the intermediacy of spacer elements 29s by cross members 24x fixedly secured to cutter mechanism plant base frame channels 24c. Bolts 29c removably fasten the engine to said base frame. Such engine units have the usual flywheel and clutch enclosed within end housing 29h. The clutch may be engaged and disengaged as required by means of clutch lever 29c' shown in Figs. 2 and 4. The speed of the engine may be held within comparatively close limits as the power demand varies by means of well known fly-ball type governor that controls the throttle (not shown) and comes as standard equipment with the engine.

With the engine running and clutch engaged, power is delivered to drive shaft 29s, which preferably is directly coupled to the input shaft 30s of twin speed reducing unit 30 by means of flexible coupling 30c. The two output shafts of the speed reducer in turn may be directly coupled to gear type hydraulic pumps 31 and 32 by means of flexible couplings 31c and 32c, respectively, as shown in Figs. 2 and 5.

Transverse channels 24y may be fixedly secured to base frame channels 24c and to base plate 24p. The reduction gear may be mounted upon this base plate directly, and the two hydraulic pumps also may be mounted thereupon through the intermediacy of spacer channel 24s, which in turn is fixedly secured to said base plate. Bolts 30b, 31b and 32b serve to removably secure their their respective reduction gear and hydraulic pump units in position.

The preferred fluid for use in the hydraulic system may be any suitable refined mineral oil of the proper viscosity for the operation of the motivating units. Such an oil having a viscosity of approximately 150 seconds of 100 deg. Fahr., as measured by a Saybolt Universal viscosimeter, has been found to give satisfactory results in this locality.

After removing plug 33p, said fluid may be poured into an elevated rectangular, covered, sheet metal storage tank 33 having legs 33a fixedly secured to channels 24c and base plate 24p, as shown in Figs. 4 and 5. Fluid from the bottom of said tank flows through a suction conduit, comprising a combination of suitable pipe fittings and hose 31s, into the suction side of pump 31, and through a like combination 32s into the suction side of pump 32. It will be noted in Fig. 5 that the ends of pipe fittings 31s$^1$ and 32s$^1$ terminate a short distance above the interior surface of the bottom of the tank to prevent any scale or dirt from entering the pumps. If desired a fine-mesh screen filter, not shown, may be placed in each of these suction conduits as additional protection for the pumps.

Hydraulic operating and control system

The pressure conduit 31d for pump 31 preferably comprises a suitable combination of fittings, tubing and a short length of hose near the pump to connect it to pressure inlet and relief valve unit Vr of multiple unit valve assembly V shown diagrammatically in Fig. 10. When all of the valves of this assembly are in their neutral positions the discharge from said pump may flow through a fluid passage way provided through the several valve units successively into cross Vx, and through return conduit 33r of suitable lengths of tubing and fittings back into the top of tank 33.

The pressure conduit 32d for pump 32 may be similar to that for pump 31, but connects it to pressure inlet and relief valve unit Vr' that in turn is connected to control valve V48, which permits the fluid to flow into cross Vx so long as said valve is in its neutral position.

The preferred branch conduit runs to the several hydraulic operating cylinders also are shown diagrammatically in Fig. 10, but have been omitted for the sake of clarity from the other figures of the drawings. Although not indicated in said diagram, it will be understood that each said conduit run to a given cylinder preferably consists of the required lengths of pipe, tubing and appropriate fittings, plus a suitable length of flexible hose for the end connection to said cylinder where there is a lateral displacement thereof as the piston and piston rod are forced outwardly and inwardly by the motivating fluid.

As will be seen in this diagram, pump 31 preferably is used to supply said motivating fluid to each of the five operating cylinders through the intermediacy of the corresponding control valve of assembly V; while pump 32 preferably is reserved for the operation of hydraulic motor 48, which is used to drive the cutter sickle and is controlled by valve V48, as hereinafter more fully described.

Control valve details

Each of the valves of valve assembly V may have a body casting v1 that provides a plurality of compartments and a valve piston v2 that controls the flow of fluid between said compartments. Pressure fluid flow between adjacent said valves may be provided by aligned apertures v3' in the side walls of the assembled body castings. The valve assembly may comprise intervening gaskets v4, spacer pipes v6 between the group of cylinder valves and the sickle motor valve 1 and through bolts and nuts v5. See Figs. 12 and 10.

Said valve assembly preferably is removably mounted upon support plate S by means of cap screws S1. Said plate and brackets S2 may be fixedly secured to support angles S3 which in turn are fixedly secured to a side channel of frame 23, as shown in Figs. 2, 3 and 11.

Each valve piston is provided with an operating lever L which may have a bifurcated pivot member removably secured to plate S by means of a cap screw S1', the group of said pivot members being adapted to receive a removable alignment rod L2 which pivotally supports all said levers between the bifurcated portion of their respective said members. Each said lever may be connected to its respective valve piston by means of link L3 and pins L4, as shown in Fig. 11.

Included at the ends as a part of valve assembly V, and also secured thereto by means of bolts v5, are relief valve units Vr and Vr'. Each of these may have a body casting r1 with a partition wall and boss r1' through which duct r2 is provided to connect pressure chamber r3 with pressure duct r4 in body r5 of relief valve R. Connections with pumps 31 and 32 are provided by conduits 31d and 32d, respectively, as hereinbefore described. The discharge flow through said relief valves is returned to tank 33 through return conduits 33r' and 33r for unit Vr, and through return conduits 33r'' and 33r for unit Vr'. See Fig. 10.

Such discharge flow results whenever the fluid pressure increases abnormally, thereby producing sufficient force to raise ball r6 from its seat against the force exerted by compression spring r7, which is adjustable by means of screw r8. This permits the fluid to flow through a plurality of drilled apertures r9 into discharge duct r10 and thence through the aforesaid return conduits back into the storage tank.

Aperture r3' aligned with valve aperture v3' provide pressure fluid connection between chamber r3 and pressure chamber v3 of the adjoining valve body. Each valve piston has a plurality of depressions v7 which may be used cooperatively with a ball, spring and plug assembly v7' to hold said piston in the neutral and full operating positions indicated in Fig. 12. Each valve body casting may have a full-length vertical partition v8 that divides the interior space into inlet pressure chamber v3 on one side, and with the aid of two horizontal partitions v9 into outlet pressure chamber v10 and discharge pressure chambers v11 and v12 on the other side. With all valve pistons in neutral fluid may flow through a fluid passage way comprising chambers v3, ports v13, valve restrictions v14 and chambers v10, thence back to tank 33 through cross Vx and return conduit 33r, as hereinbefore stated.

All double acting valves may have a chamber v11 that connects with tapped outlet opening v11' adapted to receive the end of a branch conduit that connects to one end of an operating cylinder; and chamber $v12$ likewise may connect with tapped opening $v12'$ and a branch conduit that in turn connects with the other end of said cylinder.

Control valve operation

When lever L of a valve is moved to its "out" position, the corresponding valve piston is moved to its "out" position. This closes port $v13$ after opening port $v15$, hence the fluid then flows from chamber $v3$ through port $v15$, around valve restriction $v16$ into chamber $v11$ and the cylinder connected thereto by way of the aforesaid branch conduit, thereby forcing the piston of that cylinder in one direction. Moving said valve piston to its "out" position also connected ports $v19$ and $v20$ by means of valve restriction $v18$, thereby permitting the fluid in the other end of said cylinder to return to tank 33 by way of chambers $v12$ and $v10$, and the connecting conduits.

Likewise, when said lever and valve piston are moved to their "in" positions, port $v15$ is closed after opening port $v13$, which again is closed after opening port $v17$, hence the fluid then flows from chamber $v3$ through port $v17$ and around valve restriction $v18$ into chamber $v12$, thence through opening $v12'$ and the connecting branch conduit into the opposite end of said cylinder, thereby forcing the piston of that cylinder in the opposite direction. Moving the valve piston to said "in" position also connects ports $v19'$ and $v20'$ by means of valve restriction $v16$, thereby permitting the fluid in the inactive end of said cylinder to return to the storage tank by way of chambers $v12$ and $10$, and the connecting conduits.

It will be apparent that when the valve piston of such double acting valves is in its neutral position all but ports $v13$ are closed and fluid is prevented from either entering or leaving the cylinder controlled, thereby maintaining its piston and connected ports in the position occupied at the time said valve piston was moved to its neutral position.

Where the cylinder is single acting and depends upon the weight of the operated part to return the fluid to the storage tank, use is made of a single acting valve, such as V43, which may be provided only with outlet opening $v12'$ that connects with its branch conduit to the stuffing gland end only of cylinder 43. Moving piston $v2$ of said valve to its "out" position connects chambers $v3$ and $v12$ and disconnects chambers $v3$ and $v10$, as previously explained, and the resulting fluid flow forces the cylinder piston inwardly. Moving said valve piston to "neutral" again connects chambers $v3$ and $v10$ and closes port $v17$ thus preventing the return flow of fluid from said cylinder and holding the cylinder piston and coacting parts in position. To let the cylinder piston return fluid to tank 33 and move outwardly said valve piston is moved to the "in" position. This closes port $v13$ but opens port $v15$ so fluid can flow from chamber $v3$ to chamber $v10$ by way of port $v15$, valve restriction $v16$ and aperture $v15'$ in partition $v9$. At the same time valve restriction $v18$ connects ports $v19$ and $v20$ which permit fluid from the end of said cylinder to be returned by its piston to chamber $v10$ which is connected with said tank, as previously described.

Sickle motor control valve

Valve V48 for the control of the sickle motor may be similar to single acting valve V43, but the valve body casting provides only ports $v13$ and $v17$, and the valve piston may have only restrictions $v14$ and $v18$. The position of chamber $v3$ in relation to chambers $v10$ and $v12$ may be reversed.

With the valve piston in its "neutral" position the fluid flow is from pump 32 through pressure conduit $32d$ into chamber $r3$ of relief valve unit Vr', and through apertures $r3'$ and $v3'$ into chamber $v3$ of said valve V48, thence through ports $v13$, around valve restriction $v14$ and into chamber $v10$, from which it flows through the nipple in tapped aperture $v3''$ into cross Vx and back to tank 33 through conduit $33r$, as hereinbefore stated.

When it is desired to operate the aforesaid sickle motor piston $v2$ of valve V48 is moved to its "out" position, whereupon ports $v17$ first are opened and then ports $v13$, are closed. This prevents the pressure fluid supplied by pump 32 from returning to tank 33, but permits it to flow from pressure chamber $v3$ through port $v17$, around valve restriction $v18$ and into chamber $v12$, thence through outlet opening $v12'$ and conduit run $49a$ and associated parts to fluid motor 48. The discharge from said motor may be returned to tank 33 direct through conduit run $49b$ and its associated parts. Obviously when the piston of said valve is returned to its "neutral" position port $v13$ is opened and port $v17$ is closed so the flow of pressure fluid again is diverted from the sickle motor back into tank 33 by way of conduit $33r$.

Although one preferred form of piston-type control valve and an associated relief valve unit have been illustrated and described so the operation thereof may be fully understood, any other kind of control valve or relief may be used that will enable the operator to properly control the several motivating units of the hydraulic system of the invention.

Cutter mechanism plant adjustments

Referring again to cylinder 26, hereinbefore described, it will be seen in Fig. 10 that said cylinder is connected by means of branch conduit runs $26a$ and $26b$ to valve unit V26 of the valve assembly for the convenience of the operator. When said valve is moved to its "out" position the fluid pressure forces the piston back into cylinder 26, and this in turn swings the cutter sickle mechanism plant in a clockwise direction on the mobile carrier; and when said valve is moved to its "in" position the fluid pressure forces said piston in the opposite direction and swings said plant counter-clockwise.

When said valve V26 is moved to its neutral position, the piston in cylinder 26 is prevented from moving in either direction, as hereinbefore explained. From this it will be understood that the cutter sickle and associated coacting elements supported by the turntable will be held in the position arrived at when said valve is moved from either operating position to its neutral position.

When in the working position shown in Fig. 2, especially if cutting brush, there is the possibility of the sickle striking an unseen obstruction, such as a large rock or stump, which may seriously damage the equipment before the operator can actuate the necessary mechanism, or the driver of the mobile carrier can stop its forward motion.

In order to prevent damage under such conditions, cylinder 26 may be made extra long and relief valve $26r$ associated therewith by connecting it between conduits $26a$ and $26b$ by means of conduits $26c$ and $26d$, as shown in Fig. 10. Said relief valve is so connected and adjusted as to open and permit fluid to flow from the rear side to the front side of the piston so it can move in toward the yoke end of said cylinder and permit the turntable to turn in case any abnormal exterior force tends to move the cutter sickle plant in a clockwise direction on the mobile carrier. By using another such and like connected but reversed relief valve, it will be apparent that it would function in similar manner in case an abnormal force should tend to turn said plant in the opposite direction.

Adjustable base frame

The drawings show cutter mechanism plant base frame 24 and the appended mechanism in the retracted or extreme right position relative to turntable frame 23 as viewed in Fig. 4. Adjustment outwardly to the left (right as viewed in the other figures of the drawings) preferably is accomplished by means of cylinder 36, conduit runs 36a and 36b, and control valve V36.

Brackets 34 and 35 are fixedly secured to side channels 23c and 24c respectively. The yoke end 36y of said cylinder 36 is secured to bracket 34 by pin 34p, and yoke end 36x of the piston rod is likewise secured to bracket 35 by pin 35p. See Figs. 2 and 4. When fluid under pressure is applied to the yoke end of said cylinder by moving valve V36 to its "out" position (Fig. 12), the piston and piston rod are forced outwardly, thus moving frame 24 outwardly on trucks 25 relative to frame 23; and when said fluid is admitted to the stuffing-gland end by moving said valve to its "in" position, the piston and piston rod of said cylinder are withdrawn, thereby moving frame 24 in the opposite direction.

By thus manipulating valve V36 it will be apparent that the operator may control the lateral extension of frame 24 and its appended equipment in relation to the body of truck 19, and hold it there by returning valve V36 to its neutral position.

Support frame for cutter sickle

Driving mechanism 47 for heavy-duty cutter sickle 49 may be removably secured to the outer end of telescoping support frame 37, which preferably consists of an outer frame 37f and inner frame 37g associated therewith and slidable therein, as shown in Fig. 9. The outer frame may comprise side channels 37c, rear cross channel 37x and forward cross plate 37p having exterior upturned end portions, all fixedly secured together. Said side channels may be fixedly secured to shaft 37s, which is journalled in bearings 24b removably secured to channels 24c by bolts and nuts 24d. Said shaft thus serves as both a pivot and a cross member for frame 37f. Inner frame 37g comprises side channels 37c', end cross channel 37x' and end top and bottom cross plates 37p', likewise all fixedly secured together.

The relative position of frame 37g within frame 37f may be changed easily and quickly by means of cylinder assembly 38, which has conduit runs 38a and 38b connecting it to valve unit V38. Said cylinder has its rear yoke end pin-connected to bracket 39 fixedly secured to cross channel 37x of frame 37f, and its piston rod end pin-connected to bracket 40 fixedly secured to end cross channel 37x', the arrangement being such that said cylinder is positioned between cross plates 37p of frame 37. See Fig. 9. between cross plates 37p of frame 37g. See Fig. 9.

The motivation of the aforesaid telescoping support frame through a wide range of vertical angular operating positions may be accomplished by means of activator 43 and the coacting mechanism elements shown best in Fig. 5. Said mechanism elements may consist of chain quadrant 41 fixedly secured to side channel 31c, chain 42 removably secured at one end to said quadrant by bolt and nut 41b and at its other end to piston rod 43x by means of clevis 42c, the yoke end 43y of cylinder 43 being secured by bolt and nut 44b to braced bracket 44, which is fixedly secured to side channel 24c. Bracket 45 fixedly secured to leg 33a of tank 33 serves as a support for the other end of the cylinder.

Conduit run 43b connects the stuffing gland end of said cylinder to single-acting valve unit V43. When this valve is moved to its "out" position the piston of cylinder 43 is forced inwardly thereby raising frame 37, which is held in a desired operating position by returning said valve to its neutral position. Moving said valve to its "in" position permits the fluid in the cylinder to return to tank 33, thus permitting the force of gravity acting upon said frame and appended mechanism to lower it to another desired position, where it again may be held by returning the valve to its neutral position, as hereinbefore explained.

It will be noted that the construction described for support frame 37 results in a member having special strength and rigidity. These qualities are required for the support of the heavy-duty cutter sickle, especially when cutting dense brush and overhanging tree branches.

Adjustable cutter sickle mechanism

The cutter sickle assembly, comprising base member 46, sickle support and driving mechanism 47, and cutter sickle 49 may be of any type and size that is suitable for heavy duty service and to which an adequate hydraulic motor 48 and other coacting hydraulic elements associated therewith may be adapted. Cutter sickle mechanism of preferred form is hereinafter explained.

The sickle driving mechanism 47 is assembled upon a base member 46 which may be bolted to the outer end of frame 39g. Said member provides a bearing 46a in which the shaft of crank disk 47b is journalled and upon which sickle support arm 47c is swingingly mounted coaxially with said shaft, and thereby serves as a means for supporting and securing the adjustable sickle mechanism to the outer end of support frame 37.

Arm 47c is provided with an upwardly disposed angle bracket that is joined by diagonal brace 47d to an upwardly disposed bracket from skid shoe 47e, the rear end of which is fixedly secured to said arm. Bolt 47f, threaded into bracket 46b and secured thereto by locknut 47f', pivotally supports the forward end of the combined support arm and skid shoe coaxially with the crank disk shaft.

Hydraulic motor 48 preferably is of the balanced gear type, and may be supported with its shaft in axial alignment with said crank disk shaft by means of bracket 46c of the base member. Flexible coupling 48c provides a driving connection between these axially aligned shafts.

Sickle bar 49b is secured to sickle head piece 47h by means of its own bolts and also by those of guide member 47g. Another guide member 47g' secured to said head piece slidably positions a cross head, which is affixed to reciprocating sickle blade 49k. Apertured lugs 47u on said head piece articulate with similar lugs on support arm 47c and through which bolt 47w passes, thus providing a transverse pivotal support for the sickle. Another skid shoe 47k is secured to the bottom of said sickle head piece. Diagonally disposed bolt and nut 47m provide means for adjusting the angular position of the sickle head piece in relation to said support arm, and thereby for adjusting the transverse angular position of the sickle bar, which carries projecting fingers 49f, the reciprocating sickle blade 49k and guides 49g.

The crank of crank disk 47b drives the sickle blade by means of pitman 47p and the usual ball and socket connection 47q to the cross head. A combination skid and diverter shoe 49s is secured to the outer end of the sickle bar.

By using an out-of-balance crank disk 47b, or other unbalancing device, the cutter sickle may be caused to vibrate laterally of its length, as explained in my hereinbefore identified copending application. Experience has demonstrated that a thus vibrating sickle is very desirable for heavy duty service, especially when cutting brush, partly because the vibrations shake the cut portions clear of the sickle so they are not again cut thereby, and partly because the vibrations enable the sickle in effect to saw its way through heavy branches. Any weed or brush portions that will pass between adjacent projecting fingers 49f of the sickle bar can be cut quickly by said vibrating sickle as the mobile carrier pushes it through the heaviest tangles of jungle-like growths.

Cutter sickle adjustments

It will be understood from the foregoing description that support arm 47c, skid shoe 47e, diagonal brace 47d, pivotally supported head piece 47g, and adjusting bolt and nut 47m, form a head frame for the support of the inner end of cutter sickle 49; and that said head frame may be rotated in relation to base member 46 about the axis of the crank disk shaft to provide for the upright angular adjustment of the cutter sickle with reference to telescoping support frame 37. See Figs. 2, 7 and 8.

The preferred mechanism for said angular adjustment may consist of bracket 50c fixedly secured to a side channel of frame 37g and adapted to be pin connected to the yoke end of cylinder 50, the piston rod of which is removably attached to an end of heavy roller chain 51 that engages the teeth of and has its other end removably attached by chain bolt 51b to a half sprocket wheel 52 fixedly secured to support arm 47c, as shown in Figs. 7 and 8.

The arrangement is such that the cutter sickle may be moved through approximately 180 degrees from the fully raised position shown in Fig. 1, where it makes an angle of about 80 degrees with frame 37, to its fully lowered position where it would be about 100 degrees from said frame. In most of the operating positions the weight of the cutter sickle assembly exerts a tension force in the roller chain, but within a certain angular range from said fully raised position it will be apparent that cylinder 50 must push the cutter sickle to lower it until its weight will operate the cylinder piston, as hereinbefore explained for cylinder 43. Furthermore, in such raised operating positions as are represented by Figs. 1 and 16a, the roller chain must transmit both tension and compression forces.

In order to enable said roller chain to transmit push forces from activator 50, guide member 53 is provided to maintain the piston rod of said cylinder and the unwound portion of said chain in axial alignment. Said guide member may consist of a pair of small channels 53a disposed with their flanges opposite and fixedly secured together in spaced apart relation by means of a plurality of side straps 53b. A guide finger 53c with reinforcing rib 53d extends beyond the ends of said channels to hold the chain in engagement with several sprocket teeth. Aperture 47x may be provided in arm 47c as a passageway for said guide finger in order to increase the permissible upward angular swing of the sickle support and driving mechanism. See Fig. 8. Inverted U-shaped support 53e and T-shaped support 53f fixedly secure said guide member to frame 37g. The piston rod is made long enough so it at all times protrudes into the guide member and serves also as a support for that end of cylinder 50.

Conduit runs 50a and 50b connect cylinder 50 with control valve unit V50 so the operator may raise the cutter sickle by moving said valve to its "out" position and lower said sickle by moving the valve to its "in" position, as will be understood from the description of the operation of the other double acting hydraulic cylinders.

Hydraulic system for sickle motor

In order to provide for the in and out adjustments of frame 37g with reference to frame 37f and yet carry the driving fluid to and from cutter sickle motor 48, telescoping tube assemblies 54 and 55 may be provided in conduit runs 48a and 48b, respectively. The frictional resistance to fluid flow of return conduit run 48b preferably is reduced by using larger tubing, piping and fittings between said motor and storage tank 33, and for that reason telescoping tube assembly 55 is made larger in diameter than its associate assembly 54, although similar in construction.

Assembly 54 may comprise an outer tube 54a having a stuffing gland 54g at one end and a suitable fitting 54f for connecting it in conduit run 48a at its opposite end, plus an inner tube 54b that is adapted to slide within said outer tube and stuffing gland, and which terminates at its outer end in a pipe fitting of conduit run 48a' to motor 48. Likewise, assembly 55 may comprise respectively a larger outer tube 55a, stuffing gland 55g, fitting 55f and inner tube 55b, which terminates at its forward end in a pipe fitting for conduit run 48b'. Support brackets 56 may removably secure said outer tubes to a side channel of frame 37f, and bracket 57 may removably secure the forward ends of the aforesaid inner tubes to the corresponding side channel of frame 37g. Stud bolts 46s, chain bolt 51b and unions 48u in conduit runs 48a' and 48b' provide means for removably securing the sickle mechanism assembly to the end of adjustable frame 37g and its coacting mechanism. See Figs. 7 and 8.

It will be noted that engine 29, fluid storage tank 33, pump 32, relief valve unit Vr', control valve unit V48, telescoping tube assemblies 54 and 55, cutter sickle drive motor 48, and conduit runs 32s, 32d, 33r'', 33r, 48a, 48a', 48b' and 48b, comprise a complete hydraulic operating and control system for said motor.

By adjusting the engine throttle governor for a speed somewhat higher than that needed to drive pump 32 at the minimum speed required to produce the fluid pressure desired for the satisfactory operation of motor 48 (usually about 600 lb. per sq. in. for a working speed of 750 R. P. M.), the spring pressure of relief valve R of unit Vr' may be adjusted so it will perform the special function of automatically regulating the rate of flow of the pressure fluid through said motor within reasonable limits, thus compensating for the variations in speed of engine 29 caused by load changes. This may be accomplished by so adjusting the spring of said relief valve that under normal operating conditions it is partly open and a portion of the pressure fluid from pump 32 flows back to tank 33 by way of return conduit runs 33r'' and 33r.

Then in case the engine speed and fluid pressure increase, the relief valve opens wider and permits a greater proportion of the fluid to return to tank 33; and conversely when the engine speed and fluid pressure decrease said valve closes somewhat, thereby allowing a smaller proportion of the fluid to return to said tank. In case the cutter sickle becomes stalled for any reason, thereby stopping the flow of fluid through motor 48, valve R should open sufficiently to permit the entire flow of pressure fluid from pump 32 to return to the aforesaid tank.

From the foregoing it will be apparent that valve unit V48 can be operated manually as a throttle valve to secure any sickle motor speed from zero to maximum that may be required under various operating conditions to produce optimum cutting results with minimum wear and tear of the equipment.

*Operating control center*

A convenient control center for the operation of the various elements of the cutter mechanism hereinbefore described, may be formed by mounting the compact valve assembly V upon a suitable support S and providing an adjustable seat 58 for the use of the operator where he can observe the functioning of the various parts, and adjust the movable elements to positions best suited to meet the cutter sickle requirement by manipulating the corresponding control valves.

Said valve assembly and seat preferably are located about as shown clearly in Figs. 1, 2 and 3 of the drawings, where the operator can look ahead and plan his manipulative changes to assure the optimum operation of the cutter sickle by correctly positioning it, by means of the aforesaid movable elements, with reference to the changing contour of the terrain bordering the roadway. The driver of the mobile carrier also may observe the cutting operation by means of a well known side view mirror; not shown, so he can assist by changing the travel direction as required and by regulating the speed of the carrier in terms of the cutting duty of the sickle. Obviously a slower speed is required when cutting heavy brush than when mowing weeds and rank grass.

The operator's seat 58 may have a depending tubular shank 58a adjustably and swingingly supported in bracket 58b by means of notched pin 58c that can be inserted in any one of a series of apertures 58d in said shank. Said bracket preferably is removably supported at its lower end by means of socket 58e fixedly secured to side channel 24c of the adjustable base frame, as shown best in Fig. 3.

The modes of operating each of the movable elements and the sickle motor have been hereinbefore explained. Figs. 1, 2 and 14a through 16b illustrate a few of the great number of sickle position changes that can be accomplished quickly and easily by the manipulation of the various control valves by the operator while he is comfortably seated at the control center with the mobile carrier in motion. The following table lists the operations accomplished by the hydraulic motivating means when each of the six control valves is moved from the stop or neutral position to the position therein indicated:

| Valve No. | Valve Position | |
| --- | --- | --- |
| | In | Out |
| V26 | Swings cutter plant inwardly to position of Fig. 1. | Swings cutter plant outwardly to position of Fig. 2. |
| V36 | Moves cutter plant inwardly on frame 23. | Moves cutter plant outwardly on frame 23. |
| V38 | Slides frame 37g inwardly in frame 37f. | Slides frame 37g outwardly in frame 37f. |
| V43 | Allows force of gravity to lower frame 37. | Raises frame 37 and attached cutter sickle. |
| V50 | Lowers cutter sickle at end of frame 37. | Raises cutter sickle at end of frame 37. |
| V48 | ------ | Operates cutter sickle motor. |

In the transport position shown in Fig. 1 shoe 47e preferably rests upon wood block 19b fixedly secured to floor plate 21p. To obtain the operating position shown in Figs. 2 and 14a the operator may manipulate the valves of assembly V as follows:

V43 out, to raise frame 37 to horizontal, then back to neutral.

V26 out, to swing cutter mechanism plant 90°, then to neutral.

V50 in, to lower cutter sickle to horizontal, then to neutral.

V48 out, to operate cutter sickle motor.

The position in Fig. 14b from that in Fig. 14a would be obtained by again moving V50 in until the sickle was parallel with the new slope, then back to neutral. If the contour in Fig. 14b gradually changed to that in 15a, then V43 out slightly so frame 37 would rise gradually, and V50 in or out as required to keep sickle parallel with the terrain being cut over. In case the side bank should extend upwardly still further than that shown in Fig. 15a, then V38 out, to extend frame 37, to neutral; and V43 and V50 in or out, as required to keep the sickle parallel with the terrain.

From the position of Fig. 15a to that shown in Fig. 15b, then V43 and V50 out, until near contact with shoe 46e, to neutral; then V50 in or out, to bring sickle to parallel position shown, to neutral.

Fig. 16a illustrates a position of the sickle for trimming overhanging tree branches. This position could be reached from that in Fig. 15b by V43 out, to get the height required, to neutral; then V50 in or out, to make sickle vertical, to neutral. In case the tree was further removed from the road, then V43 out, to get required angle for frame 37, to neutral; V38 and V50 out, to extend frame 37, then V38 to neutral and V50 in or out to make sickle vertical, to neutral. A tree still further from the road then could be reached simply by V36 out, to move cutter mechanism plant out on turntable frame, to neutral. A quick change from the position of Fig. 16a to that shown in Fig. 16b would simply require V43 in, to lower support frame 37, to neutral; then V50 in or out, as required to make sickle parallel with slope, to neutral.

A great many other position combinations obviously are easily obtainable in view of the foregoing brief explanations. An operator soon becomes so adept at the manipulation of the control valves that he very easily can hold the sickle in its cutting position next to the terrain for all reasonable conditions of cuts, fills and ditches experienced along the roadway, and can as easily position said sickle for the expeditious cutting of heavy brush and overhanging tree branches.

Having illustrated and described a preferred form of my invention, it is submitted that said invention is particularly characterized by its improved mobility, interchangeable cutter mechanism unit, turntable support for the cutter mechanism plant and improvements in the adjustable coacting elements thereof used to position the cutter sickle; together with the adaptation of hydraulic motivating and control means for the operation of the cutter sickle and of the said elements comprising the cutter sickle positioning mechanism, whereby the cutting capacity and cutting rate of said cutter sickle are greatly improved.

The drawings and description of the form of the invention herein disclosed are to be construed as illustrative only and not restrictive. It will be understood that various other equivalent parts and changes in their arrangement may be substituted for the precise construction herein shown without departing from the spirit and scope of the invention defined by the appended claim as new and desire to protect by Letters Patent:

1. A mobile weed and brush cutter comprising, in combination, a mobile carrier having a bed frame, a foundation frame supported by and removably secured to said bed frame, a turntable having upper and lower articulated annular members with the lower said member fixedly associated with said foundation frame, a cutter mechanism plant supported by the upper member of said turntable, hydraulic cylinder and piston means operatively connected between said foundation frame and the upper member of said turntable, fluid pressure supply means, conduit means connecting said fluid pressure supply means with said hydraulic cylinder, and remote control valve means in said conduit means, said cylinder and piston means and said fluid pressure supply means and said conduit means and said control valve means providing a hydraulically motivated and valve controlled actuator operatively connected between the mobile carrier and the cutter mechanism plant for adjustably swinging said cutter mechanism plant relative to said foundation frame.

2. In a weed and brush cutter of the class described, the combination with a mobile carrier of pivotal means having upper and lower articulated members with the lower of said members associated with said carrier, a cutter mechanism plant supported by the upper member of said pivotal means, a fluid motivated and valve controlled actuator operatively connected between the mobile carrier and the cutter mechanism plant and having a cylinder and a piston for adjustably swinging said cutter mechanism plant upon said pivotal means relative to said mobile carrier, said cylinder having fluid pressure end conduits connected with opposite end portions thereof, and a relief valve in said conduit means arranged to be opened by abnormal fluid pressure in one end portion of the cylinder and in the conduit connected therewith to provide a relief flow of fluid from one side to the other of said piston whenever an abnormal exterior force tends to turn said cutter mechanism plant in a predetermined direction upon said turntable.

3. A mobile weed and brush cutter having, in combination, a mobile carrier, a cutter plant foundation frame supported by and removably secured to said mobile carrier, a turntable frame, a turntable having lower and upper articulated annular members which are fixedly secured respectively to said foundation frame and to said turntable frame, a cutter mechanism plant having a base frame, rolling means for movably supporting the base frame of said cutter mechanism plant upon said turntable frame, providing extensile and retractile longitudinal adjustment of the base frame of said cutter mechanism plant relative to said turntable frame, viding extensile and retractile longitudinal adbetween the base frame of said cutter mechanism plant and said turntable frame, fluid pressure supply means, conduit means connecting said fluid pressure supply means with opposite end portions of the hydraulic cylinder means; and control valve means in said conduit means, said cylinder and conduit means and control valve providing a hydraulically motivated and valve controlled actuator for adjustably moving the base frame of said cutter mechanism plant relative to said turntable frame.

4. In a mobile weed and brush cutter, the combination of a mobile carrier, a turntable associated with said carrier, a turntable frame supported by said turntable, a base frame, a cutter mechanism plant carried on said base frame, rolling means movably supporting said base frame upon said turntable frame, providing speedily operable extensile and retractile longitudinal adjustment of the base frame of said cutter mechanism plant relative to said turntable frame, hydraulic cylinder and piston means connected between the base frame of said cutter mechanism plant and the turntable frame, fluid pressure supply means, conduit means connecting said fluid pressure supply means with the hydraulic cylinder; and control valve means in said conduit means, whereby said cutter mechanism plant may be adjustably moved on said turntable frame, said cylinder and piston means and conduit means and control valve means providing a hydraulically motivated and valve controlled actuator for adjustably moving said base frame relative to said turntable frame.

5. In a device of the class described, the combination of a base frame, a support frame vertically swingingly associated at one end with said base frame, adjustable cutter sickle mechanism associated with the other end of said support frame, hydraulic cylinder and piston means connected between said base frame and said support frame, fluid pressure supply means, conduit means communicatively connecting said fluid pressure supply means with said hydraulic cylinder, and control valve means in said conduit means, said cylinder and piston means and fluid pressure supply means and conduit means and control valve means cooperating to form a hydraulically motivated and valve controlled actuator providing a speedily operable control for swingingly adjusting said support frame.

6. In a device of the class described, the combination of a base frame, a telescoping support frame swingingly secured at one end to said base frame, adjustable cutter sickle mechanism secured to the other end of said telescoping support frame, hydraulic cylinder and piston means connected between two relatively movable parts of said telescopic support frame, fluid pressure supply means, conduit means communicatively interconnecting said fluid pressure supply means and said hydraulic cylinder, and control valve means in said conduit means, whereby there is provided a hydraulically motivated and valve controlled actuator providing a speedily operable control for varying the effective length of said telescoping frame.

7. In a device of the class described, the combination of a base frame, a telescoping support frame including at least two relatively longitudinally movable parts vertically swingingly secured at one end to said base frame, hydraulic cylinder and piston means connected between said base frame and said support frame, other hydraulic cylinder and piston means connected between two relatively movable parts of said telescoping support frame, fluid pressure supply means, conduit means communicatively connecting said fluid pressure supply means with each hydraulic cylinder and piston means, and control valves in the conduit means for each hydraulic cylinder and piston means, whereby there is provided a hydraulically motivated and valve controlled actuator providing a speedily operable control for changing the angular position of said telescoping support frame in relation to said base frame, and another hydraulically motivated and valve controlled actuator providing a speedily operable control for varying the effective length of said telescoping frame and for lengthening and shortening said telescoping support frame.

8. In a device of the class described, the combination of a cutter sickle, a plurality of adjustable coacting elements adapted to variably position said cutter sickle, a hydraulically motivated means for adjusting each said coacting element, a control valve unit for each said hydraulically motivated means, structural means assembling the plurality of said valve units into one group to form a control center, fluid pressure supply means, and conduits interconnecting said hydraulically motivated means and said pressure supply means and said assembled valve units, said pressure supply means and conduit means and valve units providing centrally controlled hydraulic system means for motivating and controlling each said hydraulically motivated means through the intermediacy of the assembled said valve units.

9. In a device of the class described, the combination of a cutter sickle, a plurality of adjustable coacting elements adapted to variably position said cutter sickle, a hydraulically motivated means for adjusting each said coacting element; a control valve unit for each said hydraulically motivated means, said valve unit having neutral and operating positions and providing a fluid passageway therethrough when in its neutral position; structural means assembling the plurality of said valve units into one group to form a control center, a relief valve having a discharge duct, a hydraulic pump, power means for driving said pump, a reservoir of fluid, branch conduit means connecting each said valve unit to the hydraulically motivated means it controls, suction conduit means connecting said reservoir to said pump, pressure conduit means connecting said pump to one end of the fluid passageway through the assembled said valve units and to said relief valve, and return conduit means connecting the other end of said fluid passageway through said assembled valve units and the discharge duct of said relief valve with said reservoir.

10. In a mobile weed and brush cutter, a mobile carrier, a turntable frame mounted on said mobile carrier for rotative movement about an upright axis, hydraulic cylinder and piston means operatively connected between said mobile carrier and said turntable frame adapted to angularly move said turntable frame; a base frame supported for horizontal movement on said turntable frame; hydraulic cylinder and piston means operatively connected between said base frame and said turntable frame adapted to move said base frame relative to said turntable frame, a support frame having one end portion pivotally connected with said base frame for vertical swinging movement, hydraulic cylinder and piston means operatively connected between said base frame and said support frame adapted to vertically swingingly move said support frame, cutter mechanism pivotally connected for vertical swinging movement with the outer end portion of said support frame, hydraulic cylinder and piston means operatively connected between said cutter mechanism and the outermost end portion of said support frame adapted to vertically swingingly move said cutter mechanism, fluid pressure supply means, conduit means connecting each of said hydraulic cylinders with said fluid pressure supply means, and an independent control valve in the conduit to each hydraulic cylinder.

11. In a mobile weed and brush cutter, a mobile carrier, a turntable frame mounted on said mobile carrier for rotative movement about an upright axis, hydraulic cylinder and piston means operatively connected between said mobile carrier and said turntable frame adapted to angularly move said turntable frame, a base frame supported for horizontal movement on said turntable frame, hydraulic cylinder and piston means operatively connected between said base frame and said turntable frame adapted to move said base frame relative to said turntable frame, a multiple part telescoping support frame having one end portion pivotally connected with said base frame for vertical swinging movement, said support frame having at least two relatively longitudinally movable parts, hydraulic cylinder and piston means operatively connected between two relatively movable parts of said support frame adapted to lengthen and shorten said support frame, other hydraulic cylinder and piston means operatively connected between said base frame and said support frame adapted to vertically swingingly move said support frame, cutter mechanism pivotally connected for vertical swinging movement with the outer end portion of said support frame, hydraulic cylinder and piston means operatively connected between said cutter mechanism and the outermost movable member of said support frame, adapted to vertically swingingly move said cutter mechanism, fluid pressure supply means, conduit means connecting the hydraulic cylinder of each hydraulic cylinder and piston means with said fluid pressure supply means, and an independent control valve in the conduit which connects with each hydraulic cylinder.

EARL W. HOLMES.

REFERENCES CITED

The following references are of record in the file of this patent:

UNITED STATES PATENTS

| Number | Name | Date |
| --- | --- | --- |
| 1,953,394 | Clapper | Apr. 3, 1934 |
| 1,958,405 | Anthony et al. | May 15, 1934 |
| 2,190,161 | Moyer | Feb. 13, 1940 |